(12) United States Patent
Jackson et al.

(10) Patent No.: US 8,547,262 B2
(45) Date of Patent: Oct. 1, 2013

(54) LIGHTING APPARATUS HAVING PLURAL ANALOG OUTPUTS

(75) Inventors: Verne S. Jackson, Maple Ridge (CA); Jeanette Elisabeth Jackson, Coquitlam (CA)

(73) Assignee: Light-Based Technologies Incorporated, Vancouver (CA)

( * ) Notice: Subject to any disclaimer, the term of this patent is extended or adjusted under 35 U.S.C. 154(b) by 291 days.

(21) Appl. No.: 13/174,570

(22) Filed: Jun. 30, 2011

(65) Prior Publication Data

US 2011/0254466 A1   Oct. 20, 2011

Related U.S. Application Data

(63) Continuation of application No. 12/484,030, filed on Jun. 12, 2009, now Pat. No. 7,994,955, which is a continuation of application No. 12/031,452, filed on Feb. 14, 2008, now Pat. No. 7,570,183.

(60) Provisional application No. 60/927,122, filed on May 2, 2007.

(51) Int. Cl.
  *H03M 1/00*      (2006.01)
(52) U.S. Cl.
  USPC ............................................ 341/133; 345/204
(58) Field of Classification Search
  USPC .................. 341/133, 110; 345/204; 327/12; 315/294, 295, 297, 312, 362
  See application file for complete search history.

(56) References Cited

U.S. PATENT DOCUMENTS

| | | | |
|---|---|---|---|
| 3,795,863 | A | 3/1974 | Umeda et al. |
| 3,823,386 | A | 7/1974 | Gilbert |
| 3,969,672 | A | 7/1976 | Wallander et al. |
| 4,308,476 | A | 12/1981 | Schuler |
| 4,388,589 | A | 6/1983 | Molldrem, Jr. |
| 4,794,383 | A | 12/1988 | Havel |
| 4,845,481 | A | 7/1989 | Havel |
| 4,965,561 | A | 10/1990 | Havel |
| 5,350,977 | A | 9/1994 | Hamamoto et al. |
| 6,016,038 | A | 1/2000 | Mueller et al. |
| 6,567,009 | B2 | 5/2003 | Ohishi et al. |
| 6,577,287 | B2 | 6/2003 | Havel |
| 6,806,659 | B1 | 10/2004 | Mueller et al. |
| 6,812,874 | B1 | 11/2004 | Johnson |
| 6,897,624 | B2 | 5/2005 | Lys et al. |
| 6,956,338 | B1 | 10/2005 | Clark et al. |
| 7,230,392 | B2 | 6/2007 | Clark et al. |

(Continued)

FOREIGN PATENT DOCUMENTS

| | | |
|---|---|---|
| JP | 57-067419 | 4/1982 |
| JP | S57-067419 | 4/1982 |
| JP | 63-049596 | 4/1988 |
| JP | S63-049596 | 4/1988 |

*Primary Examiner* — Joseph Lauture
(74) *Attorney, Agent, or Firm* — Oyen Wiggs Green & Mutala LLP

(57) ABSTRACT

The invention provides a system of generation of multi-channel analog output signals, from a single analog input signal, and the controlled activation of peripheral devices responsive to the multi-channel analog output signals. A single-channel to multi-channel analog-to-analog converter is provided to convert the single analog input signal to multiple output channels. Uni-directional coupling is used for coupling and mixing the multi-channel outputs and transferring the mixed outputs to a data bus. Signals on the data bus are used to drive the multiple peripheral devices.

35 Claims, 12 Drawing Sheets

(56) References Cited

U.S. PATENT DOCUMENTS

| | | |
|---|---|---|
| 2003/0184348 A1 | 10/2003 | Lee |
| 2004/0075576 A1 | 4/2004 | Lo |
| 2004/0178751 A1 | 9/2004 | Mueller et al. |
| 2005/0259058 A1 | 11/2005 | Yamaguchi et al. |
| 2006/0061349 A1 | 3/2006 | Guidry |
| 2007/0195073 A1* | 8/2007 | Izumi .......................... 345/204 |

* cited by examiner

LIGHTING APPARATUS HAVING PLURAL ANALOG OUTPUTS

CROSS-REFERENCE TO RELATED APPLICATIONS

This application is a continuation of U.S. application Ser. No. 12/484,030 filed 12 Jun. 2009 entitled ANALOG-TO-ANALOG LIGHTING APPARATUS AND METHODS, which is a continuation of U.S. application Ser. No. 12/031,452 filed 14 Feb. 2008 entitled SYSTEM OF MULTI-CHANNEL ANALOG SIGNAL GENERATION AND CONTROLLED ACTIVATION OF MULTIPLE PERIPHERAL DEVICES. This application claims the benefit of U.S. Application No. 60/927,122 filed 2 May 2007, the content of which is hereby incorporated by reference.

FIELD OF THE INVENTION

The invention relates generally to the field of controlling multiple devices. In particular, the invention relates to a system of generation of multi-channel analog output signals, from a single analog input signal, and controlled activation of multiple peripheral devices responsive to the multi-channel analog output signals.

BACKGROUND OF THE INVENTION

Currently, digital technologies are widely used in information and communication applications. While digital representation of information may provide improved precision, human sensory functions are believed to be fundamentally analog in nature. Frequently, information, although represented in digital form, is communicated to human users in analog form. For example, it is routine to digitize an image but present the image on a display device, with digitized signal strength converted to brightness of a light emitting element of the display device.

As is generally known, digitized signals are typically represented in discrete elements, such as bits. The relative range and resolution of a signal that can be represented in digital form are limited by the number of bits used to represent signal strength. Increasing the number of bits increases the range and resolution of the signal that can be represented in digital format. However, demand on data storage, data transmission and data generation also increases as more bits are used. Simply increasing the number of bits therefore may impose an unacceptable burden on energy consumption, data processing capability, and requirements on data transmission bandwidth and data storage.

SUMMARY OF THE INVENTION

Briefly, the invention relates to a system that generates multi-channel analog output signals from a single analog input signal. The invention also relates to controlled activation of multiple peripheral devices responsive to multi-channel analog output signals so generated. The system includes a single-channel to multi-channel analog-to-analog conversion engine, a uni-directional coupling unit that provides a uni-directional coupling of output signals of the conversion engine to a multi-channel data bus but inhibits any feedback of information from the data bus, and a drive module that interfaces the signals on the data bus to the peripheral devices to achieve controlled activation of the peripheral devices responsive to signals on the data bus.

In a first aspect of the invention, there is provided a system for controlling a group of peripheral devices responsive to variation of a single analog input signal within a range. The system includes a single-channel to multi-channel analog-to-analog signal converter for converting the single-channel analog input signal to a plurality of analog signals, the range being partitioned into a plurality of sub-ranges, a data bus having a plurality of bus lines, each of the bus lines being operatively connected to one peripheral device of the group of peripheral devices for controlling operation thereof; and a uni-directional coupling unit, the uni-directional coupling unit operatively transmitting each of the plurality of sub-range analog signals to at least one of a plurality of bus lines of the data bus and inhibiting any feedback from the bus being transmitted to the analog-to-analog signal converter. The analog-to-analog signal converter has a plurality of sub-range signal generators, each of the plurality of sub-range signal generators being responsive to the analog input signal within a sub-range of the plurality of sub-ranges to generate a sub-range analog signal. The sub-range signal generators may comprise linear amplifiers.

In a feature of this aspect of the invention, each sub-range signal generator comprises a first circuit path and a second circuit path. The first circuit path is responsive to the analog input signal within the sub-range and tends to cause an output of the signal generator to gradually increase in response to increase of the analog input signal when the analog input signal is in the sub-range. The second circuit path is responsive to the analog input signal within the sub-range and tends to cause the output of the signal generator to gradually decrease in response to increase of the analog input signal when the analog input signal is in the sub-range. The first circuit path and the second circuit path cooperate to generate the sub-range analog signal in the sub-range.

In another feature, the analog-to-analog signal converter comprises a light source and a plurality of light detectors. Each of the plurality of light detectors corresponds to one of the plurality of sub-ranges. Detection of light from the light source by the each light detector produces the sub-range analog signal. The plurality of light detectors are spaced from each other, the light source is movable relative to the plurality of light detectors, and the relative movement is responsive to the analog input signal.

In yet another feature, the analog-to-analog signal converter comprises a first magnetic coupling element and a plurality of secondary magnetic coupling elements, each of the plurality of secondary magnetic coupling elements corresponding to one of the plurality of sub-ranges, the plurality of secondary magnetic coupling elements being spaced from each other and from the first magnetic coupling element, the first magnetic coupling element being movable relative to the plurality of secondary magnetic coupling elements, the relative movement being responsive to the analog input signal, and variation of coupling between the first magnetic coupling element and the each secondary magnetic coupling element producing the sub-range analog signal.

In another feature, the uni-directional coupling unit comprises a plurality of diodes, each of the plurality of diodes coupling an output terminal of one of the plurality of sub-range signal generators to at least one of the bus lines.

In yet another feature, the uni-directional coupling unit comprises a plurality of photo-electric couplers, each of the plurality of photo-electric couplers coupling an output terminal of the each of the plurality of sub-range signal generators to at least one of the bus lines.

In other aspects the invention provides various combinations and subsets of the aspects described above.

BRIEF DESCRIPTION OF THE DRAWINGS

For the purposes of description, but not of limitation, the foregoing and other aspects of the invention are explained in greater detail with reference to the accompanying drawings, in which.

DETAILED DESCRIPTION OF EMBODIMENTS

Figure 1:
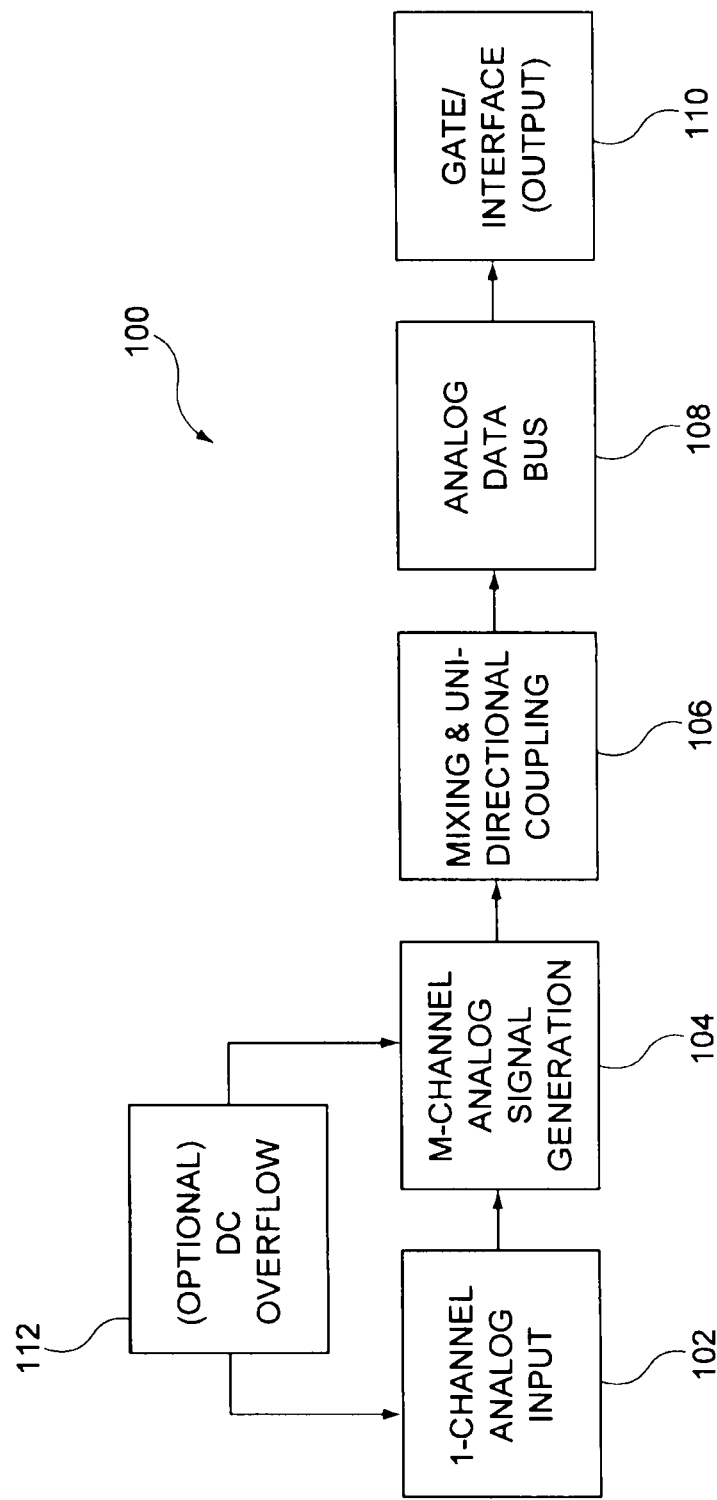
FIG. 1 is a block diagram illustrating components of a system according to an embodiment of the present invention.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

FIG. 1 illustrates schematically components of a system according to an embodiment of the present invention. As shown in FIG. 1, the system 100 has an input module 102. The input module receives as input a single-channel analog signal. The single-channel analog signal is then processed by a single-channel to multi-channel analog-to-analog signal converter 104 to convert the single-channel analog signal to multiple analog signals. The analog-to-analog signal converter 104 has multiple output channels. Each of the multiple output channels corresponds to one of the multiple output analog signals. The output analog signals may be electric current, for example. They may also be variations in electric voltage, as an increase or decrease from a neutral value. Or, they may be intensity of light beams. A uni-directional coupling unit 106 between the analog-to-analog signal converter 104 and an analog data bus 108 transmits the multi-channel analog signals to the analog data bus 108 but inhibits any feedback from the data bus 108 to the analog-to-analog signal converter 104. This provides a one-way coupling between the data bus 108 and the analog-to-analog signal converter 104. Conveniently, the uni-directional coupling unit 106 may also combine the multi-channel analog signals from different channels in different mixing arrangements prior to transmitting the mixed signals to the data bus 108. Operation or activation of the peripheral devices (not shown in FIG. 1) is controlled by signals supplied by each bus line of the data bus 108. An optional gate/interface component 110 may be disposed between data bus 108 and peripheral devices to enable the information, i.e., signals on the data bus 108, to be utilized by a wide range of peripheral devices.

In one embodiment, the input analog signal is a voltage value of an input source. Conveniently, this input analog signal can be supplied to the system through a power supply wire. An optional DC (direct current) overflow circuit 112 is provided that is coupled to both the analog-to-analog signal converter 104 and the input module 102. The overflow circuit 112 passes power supply voltage to the analog-to-analog signal converter 104 to power its operation. The overflow unit 112 also allows a margin voltage extracted from supply voltage, namely a portion of the supply voltage in excess of the system's internal regulated voltage, to be used as input, thereby allowing a single wire control and powering of the entire device or system. The internal regulated voltage is lower than the supply voltage and is used as a reference voltage for the overflow unit 112 to extract the margin voltage.

As described above, the input module 102 accepts as input a single-channel analog signal. Input is generally an analog, continuous signal. The input signal may be a continuous voltage or current signal representing (i.e., converted from) a variety of monitored signals, such as temperature, speed, relative position, ambient brightness, or applied force. The input signal also may be stepped or a composition of signals, represented in a cumulated analog form, such as an accumulated unit number from a production line. The input also may be a manually adjustable electric voltage or current. The analog signal may take the form of alternating current (AC), direct current (DC), value of a variable resistor (VR), or as a photoelectric input (PE), just to name a few examples. Conveniently, converters to convert one type of input signal, such as temperature, sound or speed, to another type of signal, such as electric current or voltage, can be provided in the input module 102.

Figure 2:
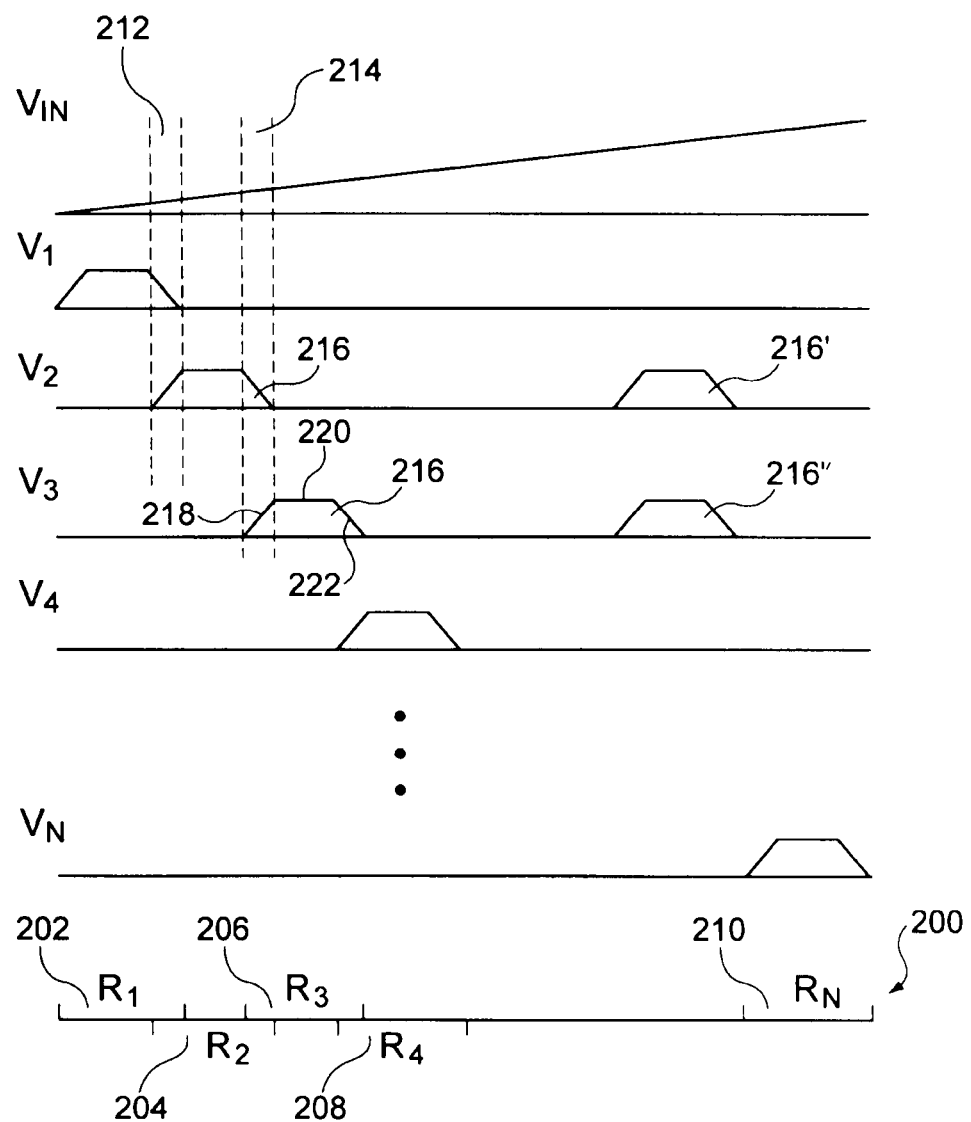
FIG. 2 illustrates an input analog signal within its range of variation and multiple analog output signals generated from the input analog signal.

The single-channel analog signal varies within a range, between a minimum and a maximum value. The range can be partitioned into a number of sub-ranges, the union of all sub-ranges being the range of the analog signal. Each of the sub-ranges overlaps with its neighbors, though it is understood that at either end of the range a sub-range has only one and therefore can only overlap with one neighbor. FIG. 2 illustrates a single channel signal $V_{IN}$ varying linearly within a range 200. Range 200 is partitioned into sub-ranges $R_1$ (202), $R_2$ (204), $R_3$ (206), $R_4$ (208), ..., $R_N$ (210), N being the total number of sub-ranges, which can be any integer number. Each sub-range can be any value, as required by the application. These sub-ranges each overlap with their respective neighboring sub-ranges. For example, the sub-range $R_2$ overlaps with both its neighbor $R_1$ at its lower end (lower overlap region 212) and $R_3$ at its upper end (upper overlap region 214).

As $V_{IN}$ varies within the range 200, the system 100 generates, as an intermediate step, a multiplicity of output analog signals, namely $V_1, V_2, V_3, V_4, \ldots, V_N$, corresponding to the sub-ranges. In other words, the system 100 maps an analog input ($V_{IN}$) in a single channel to outputs of multiple channels ($V_1, V_2, V_3, V_4, \ldots, V_N$). The mapping is typically continuous. Each output analog signal is mapped from the variation of $V_{IN}$ within its corresponding sub-range $R_1$ (202), $R_2$ (204), $R_3$ (206), $R_4$ (208), ..., $R_N$ (210), to $V_1, V_2, \ldots, V_N$, as $V_{IN}$ increases from a lower bound of a sub-range to an upper bound of the sub-range. The variation of $V_i$, in its corresponding sub-range $V_i$, defines a waveform 216. For example, as $V_{IN}$ increases, the output signal 216 corresponding to a sub-range $V_i$, increases gradually from its initial value (for example, zero) in an up-take region 218 until it reaches a peak value. The output signal 216 may remain generally constant in a portion of the sub-range as $V_{IN}$ continues its increase (thereby forming a peak region 220) and then decreases gradually, generally back to (but not necessarily) its initial value (forming a decay region 222). The up-take region 218, peak region 220 and decay region 222 together form a profile of the output signal, or "wave form" of the output signal. The durations of each of up-take region 218, peak region 220 and decay region 222 are adjustable, as will be described later in more detail in examples provided below. For example, up-take region 218 may have a duration longer than the decay region, or vice versa. The increase in the up-take region 218 and the decrease in the decay region do not need to be linear, and can take any shape, or even with reflection points, as long as the general trend remains generally increasing or decreasing. Similarly, the peak region 220 may have any duration and may be absent (zero duration) and is not necessarily flat.

One example of output analog signals is illustrated in FIG. 2. Output signals illustrated in FIG. 2 all have an approximate trapezoidal wave form 216. As the input sweeps through its own range 200, each of the output channels in its corresponding sub-range V, also generates a corresponding output analog signal. As illustrated in FIG. 2, the up-take region 218 of one wave in one channel overlaps with the decay region 222 of the wave of the previous channel. The overlap of the up-take and decay regions of neighboring sub-ranges (or neighboring channels) leads to a smooth transition of signals from one channel to the next in a transition region. A transition region is the portion of neighboring sub-ranges where they overlap. In addition to partial overlap, there also can be complete overlap, i.e., simultaneous turning on of multiple channels. Similarly, as $V_{IN}$ increases from its lower bound to its upper bound, an output channel may be responsive to $V_{IN}$ in more than one sub-ranges and generate more than one wave form 216. FIG. 2 shows two such simultaneous "ON" signals, 216', 216", in channels $V_2$ and $V_3$, with two wave forms in each channel.

Figure 3C:
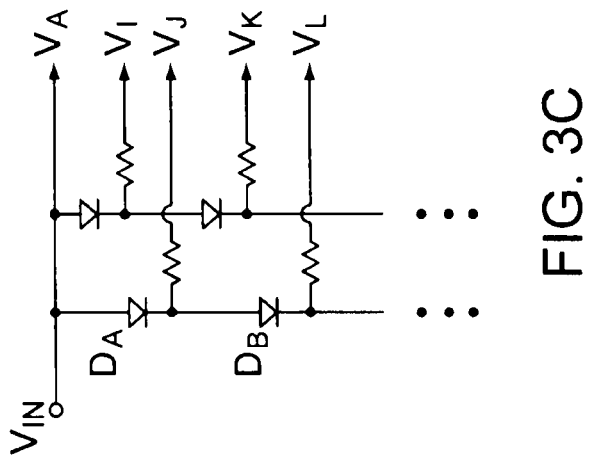
FIGS. 3A, 3B and 3C are schematic diagrams illustrating ways to divide a voltage range into different sub-ranges.
Figure 3B:
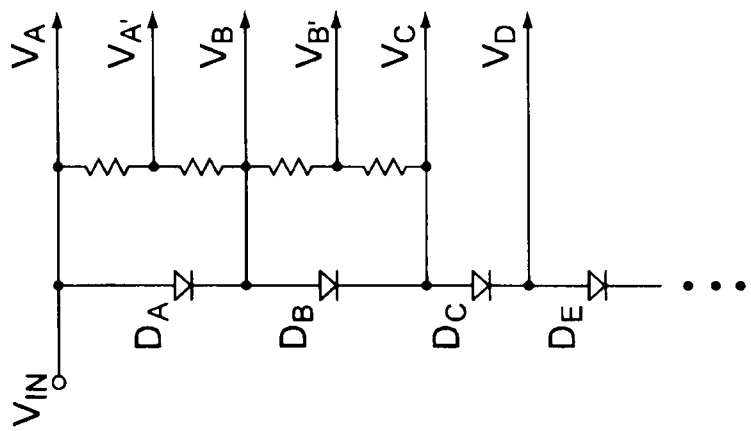
Figure 3A:
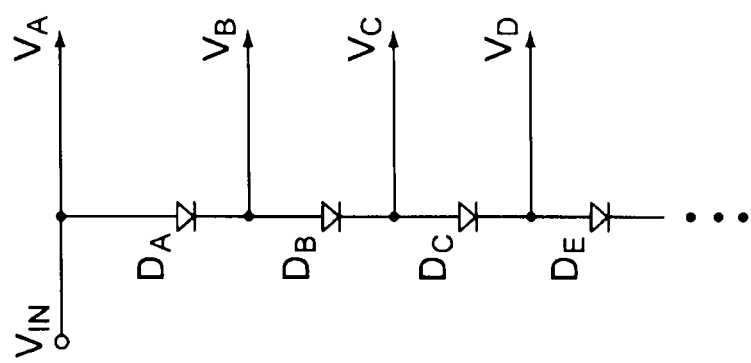

The output analog signals are generated by the analog-to-analog signal converter 104. Conveniently, the analog-to-analog signal converter (or the input module itself) partitions the input range 200 into multiple sub-ranges. FIGS. 3A, 3B and 3C provide three examples of partitioning a voltage range. As will be appreciated, there are numerous methods to partition (or, where there is no overlapping, to divide) a voltage range or current range into a selected number of sub-ranges. FIG. 3A illustrates schematically a method of dividing a voltage range into multiple sub-ranges using a series of diodes $D_A$, $D_B$, $D_C$, $D_E$ etc. with voltage outputs at nodes $V_A$, $V_B$, $V_C$, $V_D$ etc. FIG. 3B provides another example, in which sub-ranges determined by diodes $D_A$ and $D_B$ are further divided using voltage dividers consisting of two resistors each, thus providing narrower sub-ranges with voltage outputs at nodes $V_A$, $V'_A$, $V_B$, $V'_B$, $V_c$, $V_D$ etc. It should be noted that while two resistors are shown, a voltage divider consisting of resistors may use any number of resistors. FIG. 3C illustrates another example of voltage dividers consisting of two rails of diodes, each rail being connected in series. Voltage output at $V_I$ and voltage output at $V_J$ are adjustable by varying values of resistors connecting the respective voltage outputs to different diode rails, thereby providing even more refined voltage differences between voltage outputs $V_I$ and $V_J$.

Conveniently, the analog-to-analog signal converter 104 provides a sub-range signal generator 400 for each sub-range. The waveform within each sub-range is determined by the construction of the corresponding sub-range signal generator 400. The width and position of a sub-range can be further fine tuned by adjusting component properties of circuit components employed in the corresponding sub-range signal generator 400.

Figure 4A:
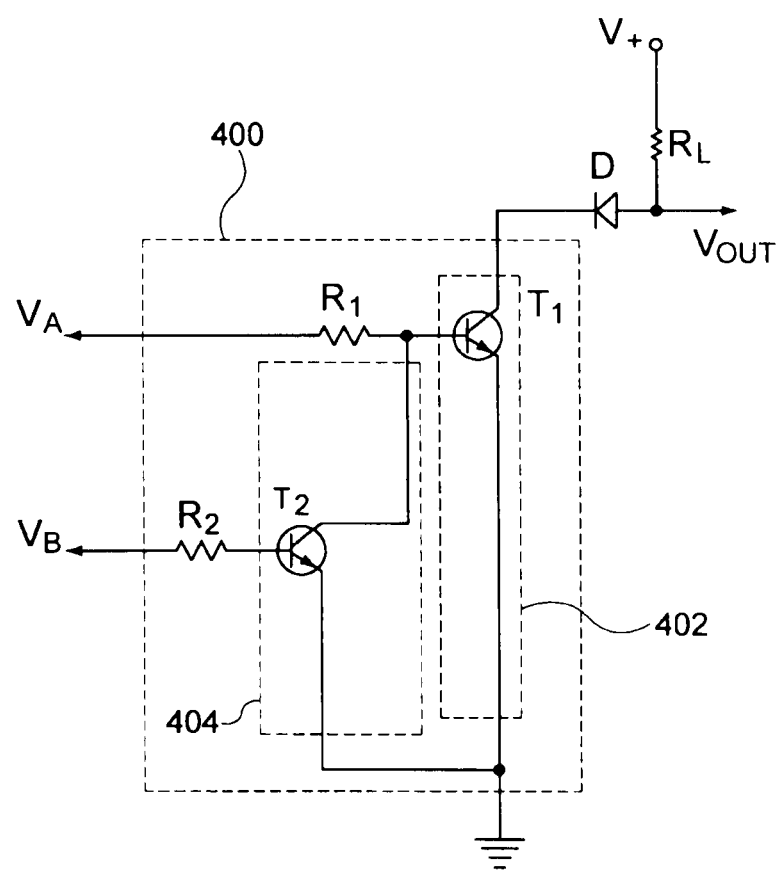
FIGS. 4A through 4C are schematic diagrams illustrating three different ways of constructing a sub-range signal generator.

Referring to FIG. 4A, there is illustrated schematically a sub-range signal generator 400 constructed from bipolar junction transistors and resistors. The sub-range signal generator 400 shown in FIG. 4A comprises two NPN bipolar junction transistors $T_1$ and $T_2$. The base of each bipolar junction transistor is connected through a current limiting resistor $R_1$, $R_2$ to the output of a voltage divider. The voltage divider provides a reference voltage such as $V_A$ or $V_B$. If the sub-range signal generator 400 is connected to $V_A$ and $V_B$ of a sub-range divider shown in FIG. 3A, the voltage difference between the connectors $V_A$ and $V_B$ of sub-range signal generator 400 is approximately the voltage drop across diode $D_A$, or approximately 0.6V. If the sub-range signal generator 400 is connected to $V_A$ and $V'_A$ of a sub-range divider shown in FIG. 3B, the voltage difference between the connectors $V_A$ and $V_B$ of sub-range signal generator 400 is a fraction of the voltage drop across diode $D_A$, i.e., less than 0.6V. For the purpose of illustrating the operation of the sub-range signal generator 400, the following description assumes that transistors $T_1$ and $T_2$ are connected to a sub-range divider as shown in FIG. 3A.

Each of the transistors $T_1$, $T_2$ is part of a circuit path in the sub-range signal generator 400. The first circuit path 402 comprises transistor $T_1$ and its base current limiting resistor $R_1$. The base current limiting resistor $R_1$ is connected to sub-range output $V_A$, i.e., directly to the input voltage, $V_{IN}$. The second circuit path 404 comprises transistor $T_2$ and its base current limiting resistor $R_2$. The base current limiting resistor $R_2$ is connected to sub-range output $V_B$, i.e., at a level approximately 0.6V lower than $V_A$. The first circuit path 402 drives the load resistor $R_L$, supplying the current source for the signal at the resistor $R_L$. The second circuit path 404 is a shunting path to ramp off the first circuit path 402 and therefore may also be regarded as a self-shunting circuit path.

Referring to FIG. 4A and FIG. 3A, the operation of sub-range signal generator 400 is now described in further detail. As the input voltage, $V_{IN}$, increases from 0, transistor $T_1$ becomes forward biased. This provides a biasing current to enable $T_1$ to first operate in its linear amplification region. This allows a collector current of transistor $T_1$ to flow through load resistor $R_L$ and produce an output voltage signal $V_{OUT}$ proportional to the biasing current. This current flowing through $R_L$ and $T_1$ increases monotonically in the linear amplification region of $T_1$ up to a desired high point determined by the value of Resistor $R_1$, i.e., the circuit path is in the pulled on state, at which point the current flowing through $T_1$ reaches a plateau. This forms the up-take region of the waveform 216.

The bipolar junction transistor $T_1$ may remain in the high state for some range of values of the input, thereby forming the peak region 220. Meanwhile, as input voltage continues its increase, $V_B$ will start to increase and will eventually overcome the voltage drop across diode $D_A$ and provide a forward biasing for the second transistor $T_2$. This represents the on-set of ramping off of the first circuit path 402. As the input continues to increase, the collector current of $T_2$ will increase. However, any current flowing through the collector of $T_2$ shunts the current flowing into the base of transistor $T_1$, thus gradually returning $T_1$ from its maximally conducting state to its linear region, until $T_2$ becomes maximally conducting. Thus, as the current through $T_2$ increases, the current through $T_1$ decreases. This forms the decay region of the waveform 216 and completes the output waveform shown in FIG. 2.

In other words, while transistor $T_1$ in the first circuit path 402 provides pull-on of signal, i.e., current in $R_L$, transistor $T_2$ in the second circuit path 404 provides a self-shunt, pull off of the first circuit path 402. The on-set of pull-on determines the lower bound of the sub-range. The complete pull off effected by the ramping on of the second circuit path 404 determines the upper bound of the sub-range. The delayed ramping on of the second circuit path 404 cooperates with the pull on of the first circuit path 402 to produce a desired profile of the output waveform. Both the width and the position of the sub-range are affected by the sub-range voltage outputs at, for example, $V_A$, $V_B$, and by values of the base resistors, $R_1$ and $R_2$, and therefore can be adjusted by adjusting characteristic values of these circuit elements. For further adjustment, emitter resistors may also be added to each of the transistors to fine tune the range and overlap. It will be appreciated that adjusting the profile in one sub-range also changes the overlap with profiles of neighboring sub-ranges when the profiles of the neighboring sub-ranges remain the same.

As described above, each sub-range has a corresponding sub-range signal generator 400. Referring to FIG. 3A, the difference between voltage outputs $V_B$ and $V_C$, namely, a voltage drop across diode $D_B$, corresponds to another sub-range. Another sub-range signal generator 400' (not shown in FIG. 1; but see FIG. 7) is connected to voltage outputs $V_B$ and $V_C$. As bipolar junction transistor $T_2$ in the sub-range signal generator 400, connected between $V_A$ and $V_B$, starts to shunt current, signal in the next sub-range, a sub-range defined by $V_B$ and $V_C$, is activated in that transistor $T_1'$ of converter 400' starts to allow current to flow, following the profile of an up-take region 218 of an output waveform, until it reaches its peak. As input voltage continues to increase, $T_1'$ will be ramped off by its corresponding second circuit path in the converter 400' in a decay region 222. Meanwhile, the output signal of the next sub-range will start its up-take growth. This process will repeat for each sub-range as the input value continues to increase, as illustrated in FIG. 2 and described earlier.

The combination of the voltage divider portion and the series of sub-range signal generators 400 forms an analog, self-shunting DC voltage/current ladder. The ladder can be of any length. In other words, range 200 of input signal can be of any value and can be partitioned into any number of sub-ranges. As the input varies from its minimum to its maximum, a wave having the waveform 216 transitions from the lowest step, namely the lowest sub-range, progressively, to the top of the ladder, namely the highest sub-range.

As will be appreciated, voltage dividers may be conveniently formed using resistors, or any other suitable means, not necessarily diodes. For example, a voltage divider consisting of only resistors can be used to replace the string of diodes in FIG. 3A. Any number of resistors can be used in such a resistor divider ladder. Such a resistor ladder can provide finer voltage drops at each step of the ladder. Similarly, although a sub-range generator 400 shown in FIG. 4A provides a circuit example using discrete transistors, other devices, such as linear gates, logic diode gates, comparators, among others, may replace the transistors circuitry for constructing the single-channel to multi-channel analog-to-analog converter.

Figure 4B:
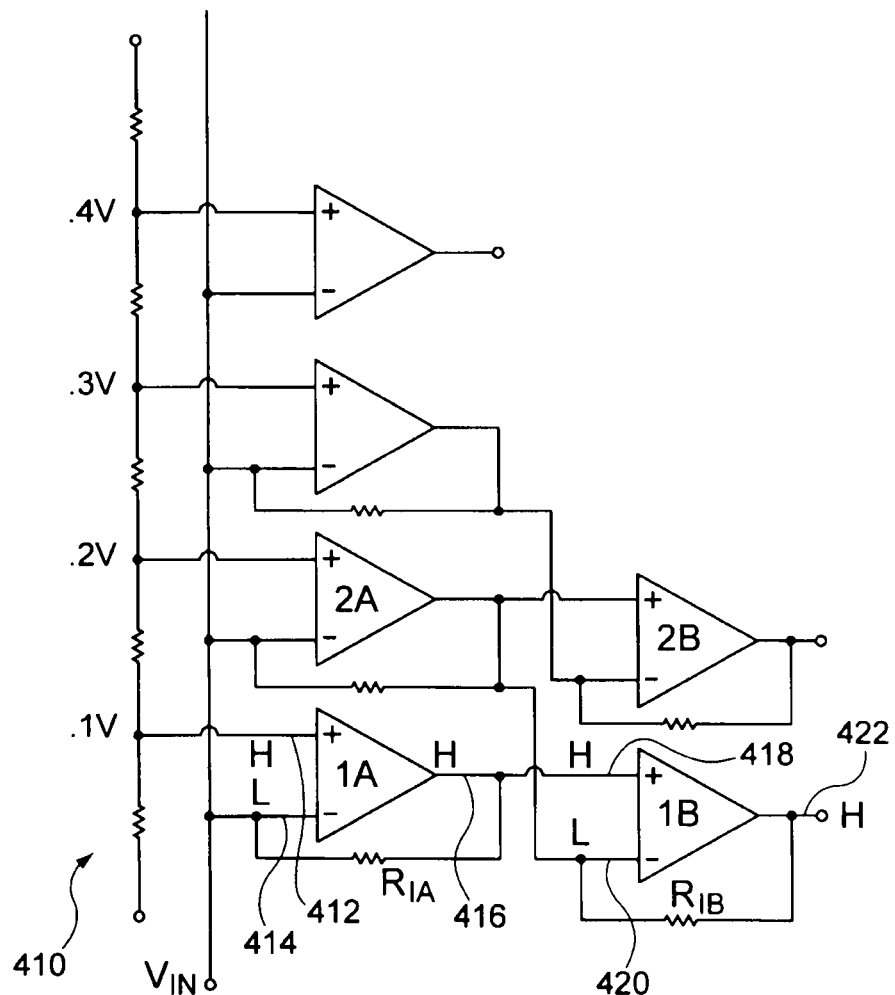

FIG. 4B shows an example, in which the voltage divider 410 is formed from resistors connected in series and the conversion of input analog signal in each sub-range is provided by two op-amps 1A, 1B connected in cascade. In this example, the first op-amp 1A and in second op-amp 1B cooperate to provide ramp-on and the second op-amp 1B and an op-amp 2A of the next sub-range provide ramp-off. Consider the case where $V_{IN}$ is initially at zero, which sets the negative terminal 414 of the first op-amp 1A at level "L". The resistor ladder is configured to set each sub-range at 0.1V, though it will be understood that each sub-range (or sub-range generator) can be configured to have any value (for example, several volts or more if necessary or a few millivolts or less if required). The positive terminal 412 of the first op-amp 1A is at 0.1V, a voltage supplied by the voltage divider 410. Consequently, the output terminal 416 of the first op-amp 1A is at level "H", so is the positive terminal 418 of the second op-amp 1B, which is electrically connected to and at the same level as the output terminal 416 of the first op-amp 1A. The negative terminal 420 of the first op-amp 1B is also electrically coupled to and at the same level as the output terminal of the second op-amp 2A, which is also at "H". Consequently, the output terminal 422 of the second op-amp is initially at "H".

As $V_{IN}$ increases and exceeds 0.1V, the first output terminal 416 is first set to "L" which subsequently toggles the output level of second op-Amp 1B and sets the second output terminal 422 to "L". As $V_{IN}$ continues to increase, but still remains smaller than the 0.2V, the second op-Amp 2A the level at the second output terminal 422 remains at "L". When $V_{IN}$ exceeds 0.2V, the second op-amp 2A is switched to "L", which causes the second op-amp 1B to switch off the first channel and returns the output at the second output terminal 422 to "H". The resistors $R_{1A}$ and $R_{1B}$ connected between the output and negative terminals of the op-amps 1A, 1B, respectively are to configure the op-amps 1A and 1B to operate also in the linear region, in addition to being able to switch between "H" and "L" levels.

Figure 4C:
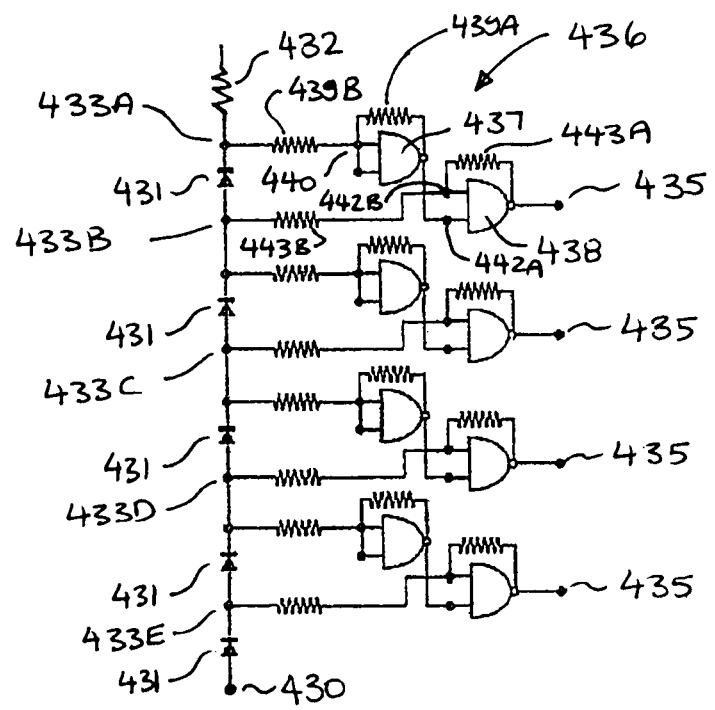

In another embodiment, a sub-range signal generator 400 is constructed from logic gates. FIG. 4C provides such an example. The operation of the signal generator constructed from logic gates is similar to that shown in FIG. 4B, described above. In FIG. 4C an input signal is presented at 430. A resulting current flows to a current sink (not shown in FIG. 4C) by way of a chain of diodes 431 and a resistance 432. Voltage is dropped across each diode 431. Thus, for a fixed input signal, the voltage at any one of nodes 433 increases as one moves from node 433A toward node 433E. The voltage at each node 433 also depends on the input signal. Outputs 435 are each driven by a circuit 436 made up of NAND logic gates 437 and 438.

Consider the case where the input signal increases over time from a small valve. Resistors 439A and 439B divide the voltage difference between the output of gate 437 and node 433A at node 440, which is connected to both inputs of gate 437. The output of gate 437 is initially high (since the voltage at node 433A is initially low). The output of gate 437 connects to one input 442A of gate 438. The other input 442B of gate 438 is connected to the output of a voltage divider made up of resistors 443A and 443B. Therefore, the output of gate 438 is initially high. As the input signal increases, the voltage presented at input 442B increases to a point at which the output of gate 438 begins to decrease. As the input signed continues to rise, the voltage rises at the inputs to gate 437 until eventually the output of gate 437 begins to go low. When this occurs, the output of gate 438 begins to go high again. This same pattern occurs for each of circuits 436 but is shifted relative to the input signal.

The output signals of all sub-range signal generators 400 form the outputs of the analog-to-analog signal converter 104, each sub-range corresponding to a unique channel. Referring to FIG. 1, the multi-channel outputs of the analog-to-analog signal converter 104 are transmitted to data bus 108 through a uni-directional coupling unit 106. The uni-directional coupling unit 106 allows signals (i.e., information) from the analog-to-analog signal converter 104 to be coupled to the data bus 108 but does not permit electric signals on data bus 108 to be communicated back to the analog-to-analog signal converter 104. In one embodiment, the uni-directional coupling unit 106 comprises a diode array 500. Information at the output of the analog-to-analog signal converter is communicated to data bus 108 via the diode array 500. Because of the uni-directional characteristics of diodes, no information from data bus 108 is transmitted back to the analog-to-analog signal converter 104.

Figure 5C:
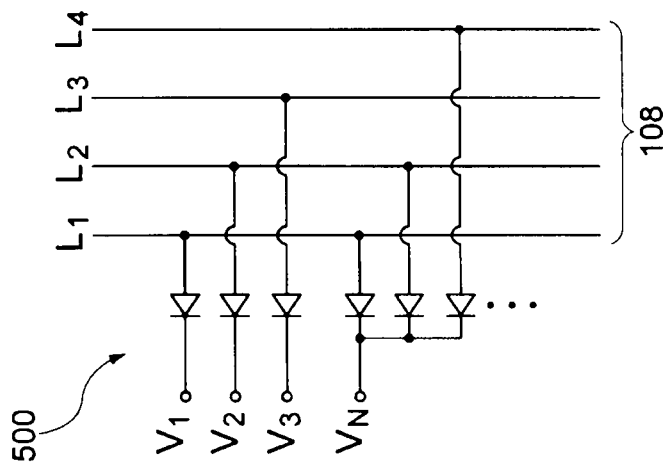
FIGS. 5A through 5D are schematic diagrams illustrating some possible connections to couple an analog-to-analog signal converter to a data bus.
Figure 5B:
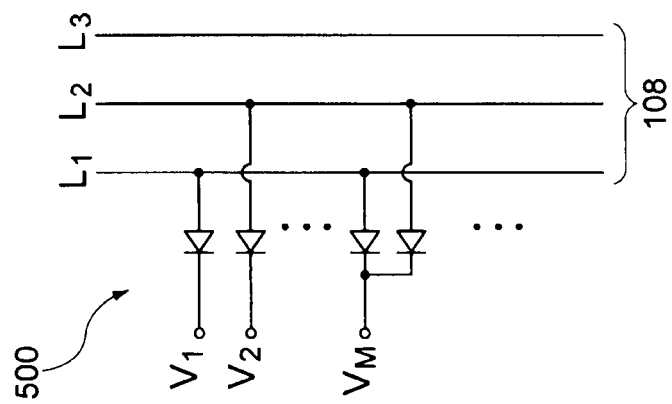
Figure 5A:
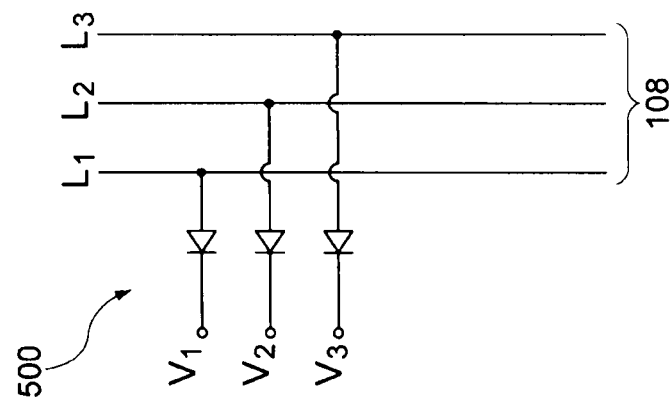

FIG. 5A illustrates one arrangement, where output from each channel is coupled to a single bus line, i.e., one of bus lines $L_1$, $L_2$ and $L_3$ of the data bus 108. Similarly, information from a single output channel can be coupled to multiple bus lines of the data bus 108, for driving multiple peripheral devices each connected to a bus line. When a signal from each bus line drives a color LED, sending a signal from one output channel to multiple bus lines can provide color mixing. FIG. 5B illustrates an arrangement, in which output $V_M$ is coupled to more than one bus line, thereby driving more than one device, which can be used for color light mixing. The example in FIG. 5B shows a coupling to two bus lines $L_1$ and $L_2$. FIG. 5C illustrates an arrangement in which output $V_N$ is coupled to three bus lines $L_1$, $L_2$ and $L_4$. On the other hand, signals from different output channels can be combined and transmitted to a single bus line, so that the peripheral device connected to that bus line is driven by a composite signal mixed from more than one output channel. For example, in the example shown in FIG. 5B, output $V_M$ is combined with a signal from output $V_1$ at bus line $L_1$, and a signal from output $V_2$ at bus line $L_2$.

Figure 5D:
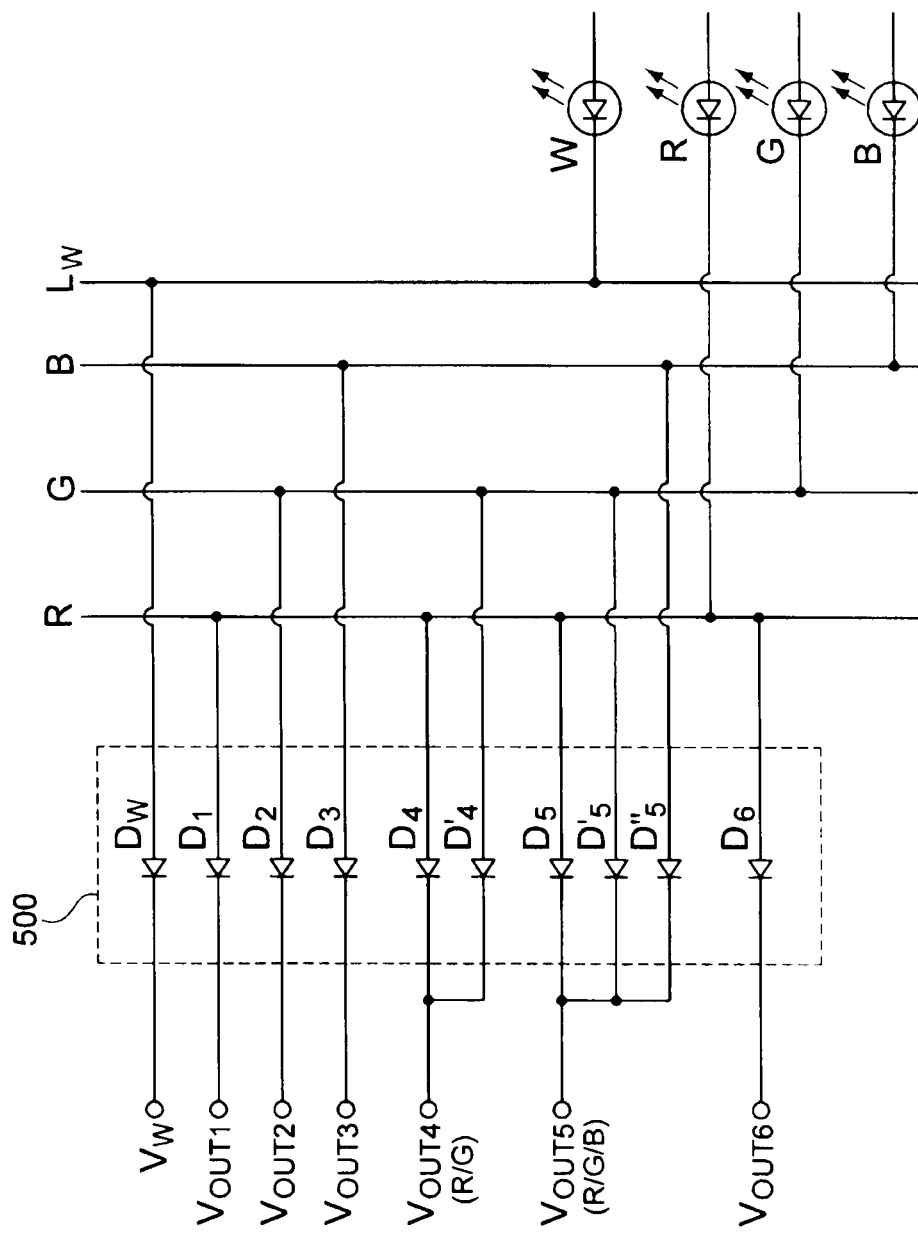

FIG. 5D provides another example. The embodiment illustrated in FIG. 5D has more output channels than bus lines, or more output channels than peripheral devices. As shown in FIG. 5D, there are three bus lines, each for connecting to a light emitting diode (LED) of a distinct color. These bus lines are labeled R for red color, G for green color and B for blue color. Signals $V_{out1}$, $V_{out2}$ and $V_{out3}$ are each connected, through diodes $D_1$, $D_2$ and $D_3$, to one of R, G, B bus lines, respectively. Signal $V_{out4}$ is transmitted to both R and G bus lines, through diodes $D_4$ and $D_4'$, respectively, thereby providing a mixing of $V_{out4}$ with signal $V_{out1}$ at R bus line and a mixing of $V_{out4}$ with signal $V_{out2}$ at G bus line. Similarly, signal $V_{out5}$ is transmitted to all three R, G and B bus lines, through diodes $D_5$, $D_5'$ and $D_5''$, respectively, thereby providing a mixing of $V_{out5}$ with signal $V_{out1}$ at R bus line, a mixing of $V_{out5}$ with signal $V_{out2}$ at G bus line, and a mixing of $V_{out5}$ with $V_{out3}$ at B bus line. Similar or other manners of connecting to the data bus 108, namely to its bus lines R, G or B or any combinations of the bus lines, may be made for other output signals from other output channels.

The selection of diodes and connection to different bus lines depends on the designation of each individual output channel. For example, in the example illustrated in FIG. 5D, $V_{out4}$ is designated as R/B mixing, i.e., mixing of R and B signals. Two diodes are provided, each connecting the R/B channel to one of R and B data lines, respectively. Similarly, $V_{out5}$ is designated as R/G/B mixing. Three diodes are provided, to connect output of the R/G/B channel to each one of R, G and B bus lines, respectively. Resistors may be used, for example, connected in series with the diodes, to control mixing ratios. It will be understood that in other applications, an output channel may represent a mixing of more than three signals in these situations. More than three diodes therefore may be necessary in these situations to connect an output channel to the data bus, each diode coupling the output channel to one of these bus lines.

FIG. 5D also shows an additional output channel, $V_{out6}$, that is coupled to the R bus line only. This provides a return to the initial color as an input signal varies from its minimum to its maximum. As a signal on each of the bus lines varies from a minimum (typically zero) to a peak and then back to the minimum, brightness of R, G, B lights, such as LEDs, packaged in a lighting unit housing, also vary accordingly. As the input value varies from the minimum to the maximum, the color of light emitted from the lighting unit changes continuously from, for example, red to green and then to blue, covering all colors in the spectrum from the red light when the input value is the smallest, to the blue color when the input value is the largest. The connection of the final output channel to the R bus line allows the LEDs, starting from red, transitioning to other colors as the input analog signal varies from its minimum to maximum, to return to red, the initial color.

As another example, a further "white" data bus line $L_W$ may be provided, for coupling to signal $V_w$ that is generated when the input has a value between that to generate $V_{OUT5}$ and $V_{OUT6}$. A signal on the bus line $L_W$ controls a white color LED. Thus, when $V_{IN}$ increases within its range, the color of light varies from red to green, from green to blue, from blue to white and then back to red. Other methods of providing white light also may be used to generate this color sequence. For example, "white" may be generated by mixing suitable amounts of red, green and blue colors. Empirically, it is found that a R:G:B ratio of 30:59:11 produces an acceptable "white" color as perceived by human eyes ("perceived white").

These diodes, $D_1$, $D_2$, $D_3$, $D_4$, $D_4'$, $D_5$, $D_5'$, $D_5''$, $D_6$ etc. form a diode array 500. This diode array 500 provides a one-way isolation between output channels of the analog-to-analog signal converter 104 and the data bus 108. The uni-directionality here is provided by diodes in the diode array. The uni-directionality allows DC information to pass through and to be transmitted to the data bus 108 but does not allow any feedback from the data bus 108 to be transmitted back to the analog-to-analog signal converter 104. As will be appreciated, coupling elements other than diodes may be used for providing the one-way coupling. Examples of uni-directional coupling units that use other coupling elements possessing uni-directionality are provided below.

The provision of the data bus 108 helps streamlining the passing of information from the analog-to-analog signal converter 104 to control peripheral devices. In the embodiment shown in FIG. 5D, there are only three peripheral devices, i.e., red, blue and green colored LEDs. Each color has its own corresponding bus line, namely one of R, G, and B bus lines. Both splitting of signals from channels representing mixed colors and mixing of outputs from different channels are facilitated by the data bus 108. Signals on each bus line are passed directly to these color LEDs. As will be described below, data bus 108 may also be operatively connected to these peripheral devices through a gate/interface module, which enables the system to drive an increased range of peripheral devices.

Although LED arrays are used in these examples to illustrate the output characteristics, the signals on these bus lines can be used to drive other peripheral devices, not necessarily an LED array. For example, the LED examples provided herein illustrate the lighting of LEDs driven by the resulting drive currents. These same currents may also be used to drive a multitude of motors, provided the driver circuitry supplies sufficient current. The motors may be used to manipulate (or control) motion of a robot, for example. These currents also can be used to control operation of peripheral devices requiring input of more than one phase, such as multi-phased currents or voltages. For example, the multi-channel output signals may be conveniently used as the output of a single phase to multi-phase converter for driving a multi-phase motor, using a single phase alternating current input. Alternatively, each output channel may also drive an analog/digital converter thereby interfacing the system with a digitally driven device, or devices. In general, driver circuitry may be provided to convert signals on the data bus to drive current or voltage loads.

Figure 6:
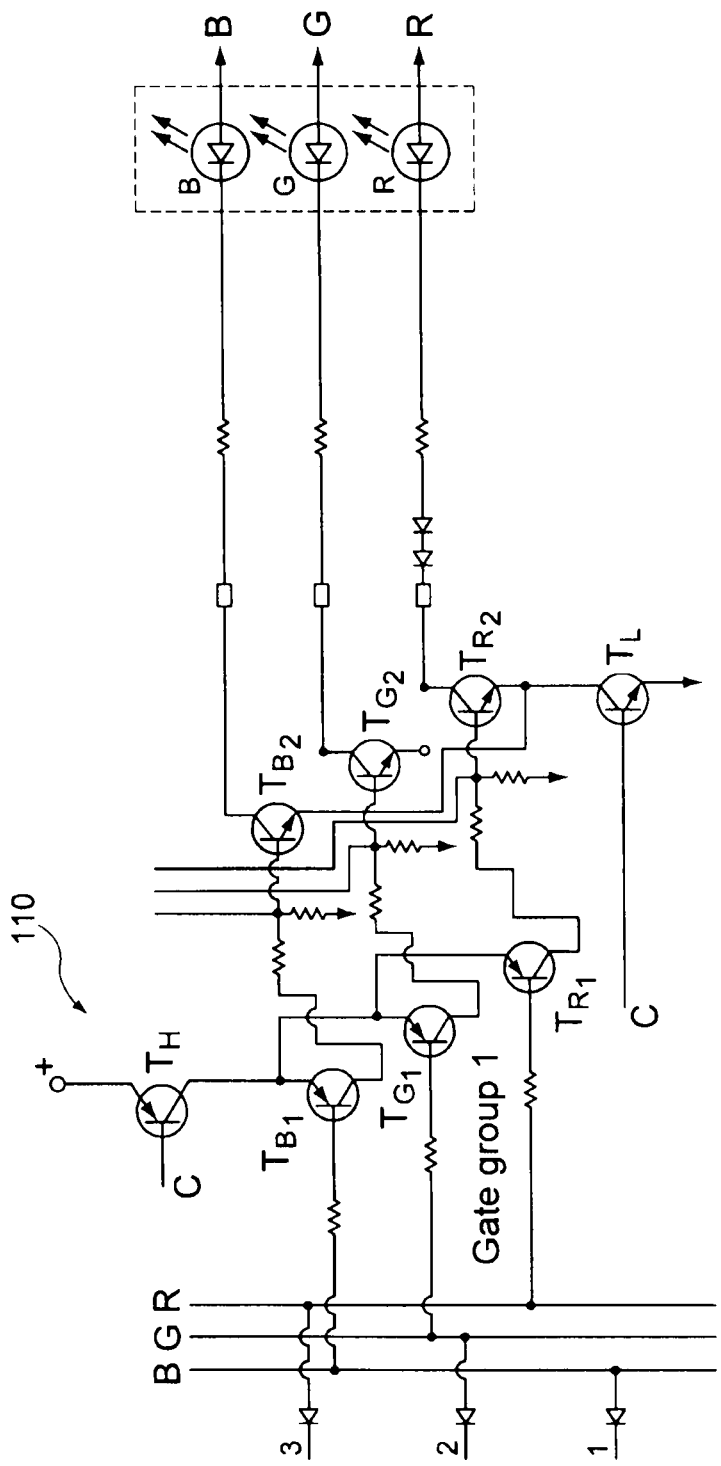
FIG. 6 illustrates schematically a gate/interface component constructed from transistors for driving three LEDs using signals on three bus lines.

Optionally, a gate/interface component 110 is provided between data bus 108 and peripheral devices as the driver circuitry, to enable the information, i.e., signals on the data bus 108, to be utilized by a wide range of peripheral devices. In one embodiment shown in FIG. 6, the gate/interface component 110 has individual bipolar junction transistors $T_{R1}$, $T_{R2}$, $T_{G1}$, $T_{G2}$, $T_{B1}$, $T_{B2}$, for driving each one of the output phases, namely, each one of the R, G and B LEDs. The gate/interface component 110 also includes a bipolar junction transistor that is used to gate the entire drive circuitry. The example in FIG. 6 shows two groups of bipolar junction transistors, with opposite output polarities. The first group comprises three transistors $T_{R1}$, $T_{G1}$, and $T_{B1}$, and the second group comprises transistors $T_{R2}$, $T_{G2}$, $T_{B2}$. The on/off of the entire drive circuitry is controlled by a "high" gate transistor $T_H$, for gating the first group of transistors, and a "low" gate transistor $T_L$ for gating the second group of transistors, each of the gate transistors being controlled by the signal on a control bus line C.

Figure 7:
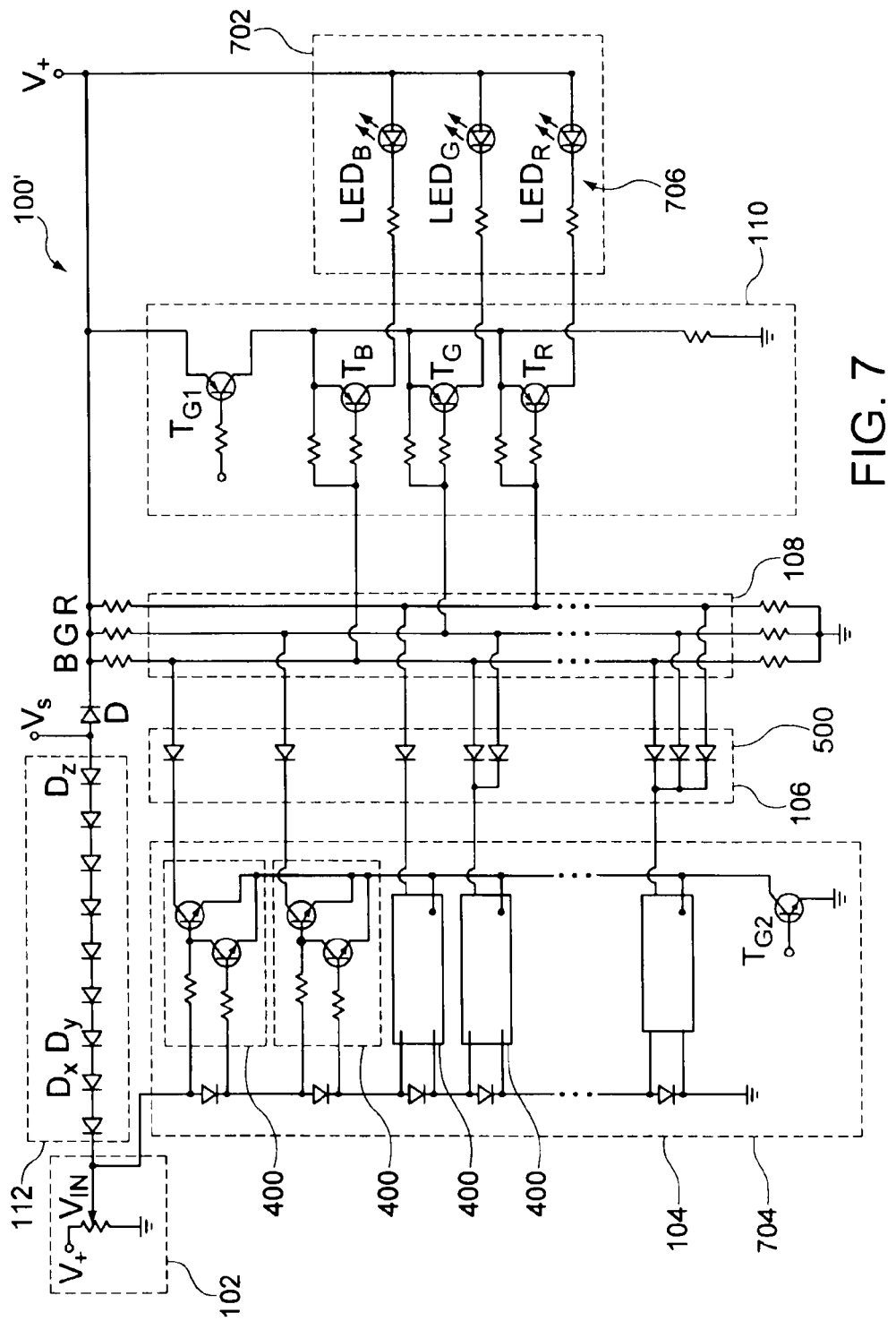
FIG. 7 is a schematic diagram showing a complete system as an alternative embodiment to that shown in FIG. 1.

Conveniently, for certain applications, it is desirable to use a single wire to supply voltage to the system as the power source and to the input module as input signal. This may be, for example, an application where three colored LEDs are used to indicate the voltage of a power supply by changing emitted colors. A DC overflow circuit 112 extracts any excess voltage above a nominal (i.e., internal regulation) voltage of the system and provides this "overflow" to the input module 102 as an input signal. This is illustrated in FIG. 7. The overflow circuit 112 includes diodes $D_X, D_Y, \ldots D_Z$ connected in series to provide a voltage drop to bring the supply voltage $V_S$ down to the expected range of input voltage $V_{IN}$. A protective diode D couples the supply voltage $V_S$ to the circuitry of the system 100', to supply power at V+. An internal voltage regulator (not shown) stabilizes the voltage powering the system 100' at V+.

Referring to FIG. 7, a complete system 100' according to an embodiment of the invention is illustrated with representative circuits shown for each of the components. This is an application for driving brightness of three individual lights, though it will be understood that more lights can be added easily or the circuit arrangement can be easily modified to drive other types of output devices. One common arrangement is to drive Red (R), Green (G) and Blue (B) LEDs, packaged in a single lighting unit 702. Alternatively, the same circuit arrangement can be used to drive grayscale lamps and UV or FR lamps. Grayscale lamps may be "cold white" (i.e., with a relatively stronger contribution from higher spectrum end, or with less red component than a typical "perceived white"), "perceived white", or "warm white", respectively. The input to the system 100' can be taken either from a variable resistor connected between V+ and the ground, or driven by the power supply voltage through a voltage overflow circuit 112, as described above. As the input value varies from the minimum to the maximum, the color of light emitted from the lighting unit 702 changes continuously from, for example, blue to green and then to red, covering all colors in the spectrum from a blue light when the input value is the smallest, to a red color when the input value is the largest.

In FIG. 7, only two sub-range signal generators 400 are shown in detail. In combination, a series of diodes and the corresponding analog-to-analog converters form a static, analog, self shunting DC voltage/current ladder 704. As described before, a number of diodes, connected in series, partitions the entire input range into a plurality of sub-ranges, each about 0.6V. The width and end points of each sub-range can be further fine tuned by, for example, selecting values of resistors employed in the analog-to-analog converter 104. Each level of the ladder 704 corresponds to an output channel. Each channel generates an output signal that generally has a single peak, as that shown in FIG. 2. The up-take region 218 of a channel, i.e., a sub-range, overlaps with the decay region 222 of a previous channel, so that as the input signal increases gradually, the overlap provides a smooth transition from the previous channel to the now activated channel. Similarly, the decay region 222 overlaps with the up-take region 218 of the next channel. As the output of the present channel fades out, the overlap between the up-take region of the present channel and the up-take region of the next channel provides a smooth transition to the next channel. Preferably, the combined output signal strength from neighboring channels adds up to 100% so that when the lighting unit transitions from one color to the other, there is no perceivable change in light intensity.

Output of each channel is coupled to a bus line through a diode in the uni-directional coupling unit 106. The diodes for coupling each output channel to the data bus form a diode array 500. As described above, the diode array 500 provides a uni-directional coupling of output signals from sub-range signal generators 400 to the data bus 108 and isolation of any feedback from the data bus 108. In addition, as described above, the diode array 500, with its connections to the data bus 108, also provides mixing of signals from different output channels, for example, a mixing of signals from R/B channel and R channel at the R bus line and a mixing of signals from R/B channel and B channel at the B bus line. Also provided by the diode array 500, with its connections to the data bus 108, is the splitting of signals from a selected output channel for coupling to different bus lines.

Each output phase, i.e., signal from each bus line, has its own drive circuit to drive a peripheral device, in this case, a colored LED. The LED array 706, comprising LED diodes $D_B$, $D_G$ and $D_R$, constitutes the peripheral devices in this example. Each drive circuit works in its linear amplification portion. For example, the output of the blue channel, or signal on the blue bus line, is coupled to the base of the bipolar junction transistor $T_B$, which in turn amplifies the signal and drives a blue color LED $LED_B$. The intensity of drive current corresponds to the strength, or value of the output received from the conversion engine. As the signal on the blue bus line reaches its peak, the drive current also reaches its peak, thereby driving the intensity of blue LED to its brightest level. Similarly, LEDs of other colors, namely a green LED $LED_G$ and a red LED $LED_R$, are driven by their respective drive circuits comprising bipolar junction transistors $T_G$ and $T_R$.

To provide further control, a gate circuit comprising a first gating bipolar junction transistor $T_{G1}$ controls all drive circuits for all channels in the gate/interface component 110. Thus, the transistor $T_{G1}$ controlled by the control signal, can selectively decouple all peripheral devices from signals on the data bus. The control signal may be supplied through a control bus line (not shown) or any other suitable means. The ability to turn on and off of the entire LED array facilitates use of system 100' to produce many visual effects, such as strobe lighting effects. Although only one LED is shown for each phase in this example, it will be appreciated that several LEDs can be connected in parallel, if low voltage V+ is used, or in series if high voltage is used, or in any suitable combination of serial and parallel connections, depending on the voltage and current requirement.

Similarly, a gating bipolar junction transistor $T_{G2}$ is provided to control the entire ladder 704. This allows selective enabling of analog-to-analog converters connected to the uni-directional coupling unit 106. For example, an alternative analog-to-analog converter (not shown) can be connected to the uni-directional coupling unit 106, operation of which is enabled through another gating transistor (not shown). Which analog-to-analog converter is enabled therefore depends on which gating transistor is ramped on. The gating transistor $T_{G2}$ therefore provides a selection function, allowing selection of one of analog-to-analog converters to transmit multi-channel output signals to the data bus.

Figure 8:
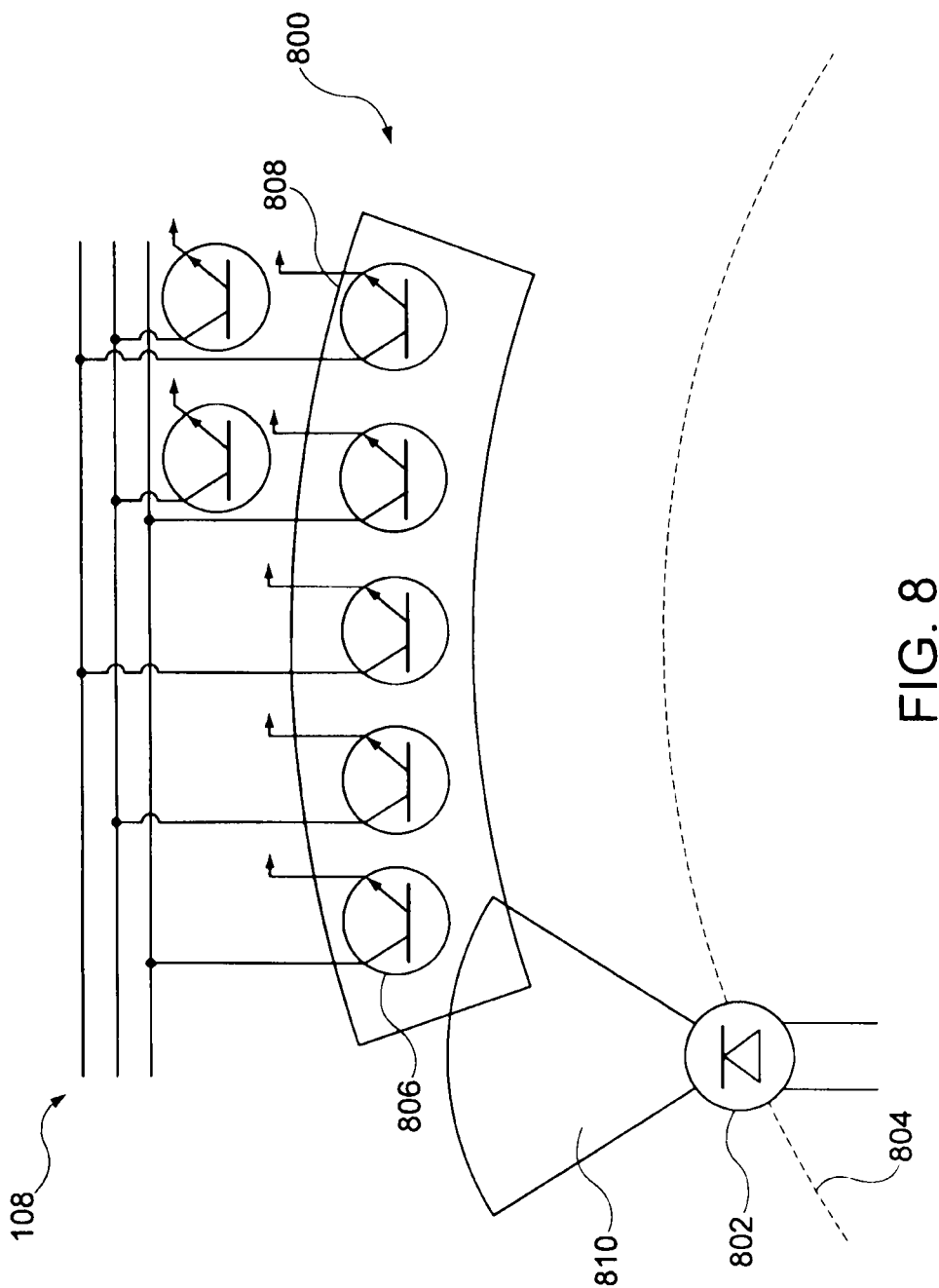
FIG. 8 shows an alternative construction of an analog-to-analog signal converter that can be used in the system described herein, two embodiments of which are illustrated in FIG. 1 and FIG. 6.

FIG. 8 illustrates the use of an alternative analog-to-analog converter. This is a photoelectric analog-to-analog converter 800. In this example, a light source 802 is provided, movable along a path, such as an arc 804. A plurality of light detectors 806 are arranged on a base 808, the light detectors being spaced from each other. The base 808 is spaced from the path 804 of the light source 802. Each detector 806 is assigned to a different channel, the output of the detector being the output value of the assigned channel. The light source 802 has a light beam 810 of a limited, yet adjustable, width. The width of light beam 810 is selected such that it does not illuminate all light detectors 806 simultaneously, though it illuminates at least two light detectors 806 simultaneously. Preferably, the width of light beam 810 and the spacing between light detectors 806 are such that the light source 802 can at most illuminate two detectors at the same time. As the light source 802 moves from one end of the arc 804 to the other end, each of the light detectors 806 is first partially illuminated, fully illuminated, partially illuminated, and then not illuminated. A light detector 806 is generally illuminated simultaneously with its closest neighbor during at least a part of the partial illumination period. The output values of the channel corresponding to the light detector 806 then follow profiles like that shown in FIG. 2. Adjusting positioning of light detectors 806 relative to each other, relative to light source 802 and relative to the width of light beam 810 allows one to adjust the profiles of signals of each sub-range and the overlapping of these profiles. Alternatively, the width of light beam 810 can be adjusted for this purpose. In addition, while electrical signal at detector 806 may be forwarded to multiple bus lines of data bus 108, multiple light detectors 108 may also be arranged at the same location, each detector being coupled to a single bus line. When these light detectors at the same location are illuminated, signals can be passed to all data bus lines connected to these detectors which provides an alternative method of activating multi-phased arrangements simultaneously.

The output values from this conversion engine can be delivered to the analog data bus 108 and to drive the multi-channel drive module, namely a gate/interface component 110, in the same manner as described above. In this example, the input is relative position of the light source 802 in reference to each of the light detectors arranged on the base 808. As will be appreciated, any relative motion between the light source and the base can be used to vary the input signal and therefore generate the multi-channel output signals. The relative position can be varied manually, using a dial, or driven by the variation of another input signal, such as temperature or voltage of a power supply. The variation of relative position also can be achieved by moving the base 808 relative to a fixed light source 802. Light detectors 806 also may be arranged on a wheel and the rotation of the wheel relative to the fixed light source may be utilized for converting an analog signal to a multi-channel analog output signals. An input signal can be utilized to drive a stepper motor (not shown) to rotate the wheel, thereby driving the generation of multi-channel analog output signals.

It will be appreciated that conversion from a single-channel analog signal can be achieved in many different ways, not restricted to examples provided herein. Some further examples are provided below, for illustration. For example, magnetic coupling based on magnetic induction may be utilized. A magnet may be used as a primary coupling element and a number of coils may be used as secondary coupling elements. In response to motion of the magnet in the vicinity of the coils, current may be generated in these coils as output signals. Similarly, a primary coil can be used as a primary coupling element. A plurality of secondary coils can be arranged in a manner similar to that of light detectors illustrated in FIG. 8. As the primary coil with electric current flowing therein is moved relative to the plurality of secondary coils, induced currents in the secondary coils form the multi-channel outputs.

Figure 9:
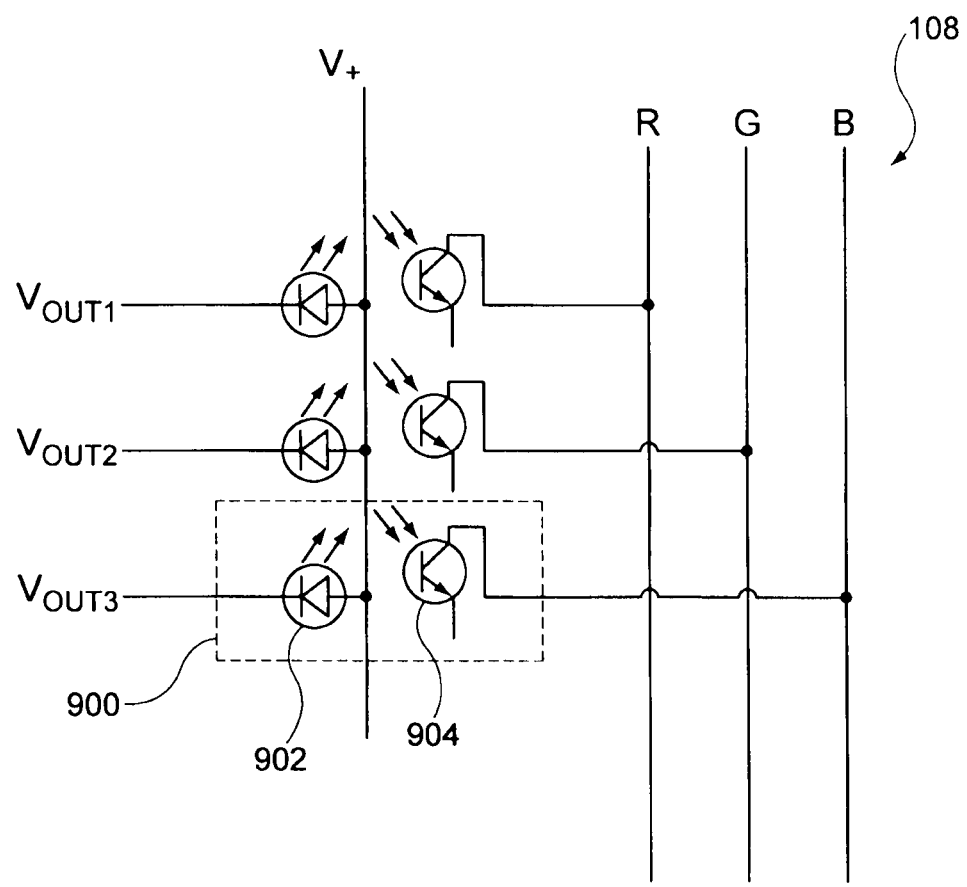
FIG. 9 shows yet another alternative construction of an analog-to-analog signal converter that can be used in the system described herein, two embodiments of which are illustrated in FIG. 1 and FIG. 6.

As also will be appreciated, the uni-directional coupling unit is not required to use diodes. Other uni-directional couplers can be used. For example, in one alternative embodiment, photo-electric coupling is used. This is illustrated in FIG. 9. As shown in FIG. 9, a photoelectric coupler 900 comprising a light detector in the nature of a photosensitive transistor 904 and a light emitting element 902, such as a white or infrared LED, replaces a diode in diode array 500. The light emitting element 902 is driven by the output signal from the analog-to-analog converter 104. Each photosensitive transistor 904 is connected to data bus 108. While light emitted from the light emitting element 902 transmits the output signal from analog-to-analog converter 104 to the light detector, no signal from data bus 108 can be transmitted back to the light emitting element 902 by the photosensitive transistor 904.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:
1. Lighting apparatus comprising:
an analog input;
a plurality of driving circuits each capable of driving a light source;
a control circuit configured to provide a plurality of analog output signals in response to an analog input signal presented at the analog input, the control circuit embodying a plurality of mappings, each of the mappings relating values of one of the analog output signals to values of the analog input signal presented at the analog input;
wherein each of the plurality of driving circuits is connected to be controlled by one of the analog output signals;

wherein the mappings are such that, for each of the analog output signals, changing the value of the analog input signal within a range causes the analog output signal to vary according to a profile specified by the one of the plurality of mappings associated with the analog output signal.

2. Lighting apparatus according to claim 1 wherein a light source of a first type is connected to be driven by the driving circuit associated with a first one of the analog outputs and a light source of a second type is connected to be driven by the driving circuit associated with a second one of the analog outputs wherein the first and second types are different.

3. Lighting apparatus according to claim 2 wherein a light source of a third type is connected to be driven by the driving circuit associated with a third one of the analog outputs wherein the first, second and third types are different.

4. Lighting apparatus according to claim 2 wherein the light source of the first type comprises a light-emitting diode configured to emit light of a first color and the light source of the second type comprises a light-emitting diode configured to emit light of a second color different from the first color.

5. Lighting apparatus according to claim 2 wherein a first one of the outputs is connected to drive at least one red light-emitting diode, a second one of the outputs is connected to drive at least one green light-emitting diode and a third one of the outputs is connected to drive at least one blue light-emitting diode.

6. Lighting apparatus according to claim 5 wherein a fourth one of the outputs is connected to drive at least one additional light source.

7. Lighting apparatus according to claim 1 wherein the plurality of analog outputs comprises at least first, second and third analog outputs, the first analog output is connected to drive a source of red light, the second analog output is connected to drive a source of green light and the third analog output is connected to drive a source of blue light.

8. Lighting apparatus according to claim 7 wherein the sources of red, green and blue light comprise light-emitting diodes.

9. Lighting apparatus according to claim 1 wherein the input signal represents a characteristic of ambient light.

10. Lighting apparatus according to claim 9 wherein the characteristic is a brightness of the ambient light.

11. Lighting apparatus according to claim 1 wherein the input signal comprises an electrical signal representing an accumulated value.

12. Lighting apparatus according to claim 1 wherein the analog input is connected to receive the analog input signal from a power supply wire.

13. Lighting apparatus according to claim 12 wherein the power supply wire is connected to supply electrical power to the control circuit.

14. Lighting apparatus according to claim 1 wherein the input signal comprises an externally adjustable electric voltage or current.

15. Lighting apparatus according to claim 14 wherein the input signal comprises a user adjustable electric voltage or current.

16. Lighting apparatus according to claim 1 wherein the input signal comprises a composition of signals represented in a cumulated analog form.

17. Lighting apparatus according to claim 1 wherein the input signal comprises a stepped analog signal.

18. Lighting apparatus according to claim 1 wherein one or more of the profiles comprises a ramp region wherein an increase in the value of the analog input signal provides a corresponding increase in the value of the corresponding analog output signal and a peak region wherein the value of the corresponding analog output signal remains generally constant as the analog input signal changes.

19. Lighting apparatus according to claim 1 wherein one or more of the profiles comprises a decay region wherein an increase in the value of the analog input signal provides a corresponding decrease in the value of the corresponding analog output signal.

20. Lighting apparatus according to claim 1 wherein each of the profiles has at least one energized portion wherein the value of the corresponding output signal is non-zero and wherein the energized portions of at least two of the profiles overlap.

21. Lighting apparatus according to claim 1 wherein the control circuit is configured to partition an input range of the input signal into a plurality of sub-ranges.

22. Lighting apparatus according to claim 21 wherein the sub-ranges each correspond to one of the outputs and, for each of the outputs, the control circuit is configured to control the corresponding output signal to be off when the input signal has a value outside of all sub-ranges corresponding to the output.

23. Lighting apparatus according to claim 22 wherein a plurality of non-overlapping ones of the sub-ranges correspond to one of the outputs.

24. Lighting apparatus according to claim 22 wherein neighboring ones of the sub-ranges overlap.

25. Lighting apparatus according to claim 21 wherein at least two of the sub-ranges completely overlap to provide simultaneous turning on of a plurality of the output signals in response to an increase in the input signal into the at least two of the sub-ranges.

26. Lighting apparatus according to claim 1 wherein one or more of the mappings comprises a non-linear mapping.

27. Lighting apparatus according to claim 26 wherein one or more of the mappings specifies a non-linear increase in the corresponding output signal in response to an increase in the input signal over a sub-range of the input signal.

28. Lighting apparatus according to claim 26 wherein one or more of the mappings specifies a non-linear decrease in the corresponding output signal in response to an increase in the input signal over a sub-range of the input signal.

29. Lighting apparatus according to claim 1 wherein each of the profiles has at least one energized portion wherein the value of the corresponding output signal is non-zero and the energized portions of different ones of the profiles correspond to different sub-ranges of values of the analog input signal.

30. Lighting apparatus according to claim 29 wherein at least one of the profiles comprises a plurality of distinct energized portions.

31. Lighting apparatus according to claim 29 wherein two or more of the sub-ranges overlap.

32. Lighting apparatus according to claim 1 wherein, for at least some values of the analog input signal, all of the analog output signals are off.

33. Lighting apparatus according to claim 1 wherein at least one of the outputs is connected to an input of an analog-to-digital converter.

34. Lighting apparatus according to claim 1 comprising a photoelectric monitor configured to generate a signal in response to light incident on the photoelectric monitor and connected to provide the signal at the input.

35. Lighting apparatus according to claim 1 comprising a plurality of light sources, different ones of the light sources operable to emit light of different colors, each of the light sources connected to be driven by one of the driving circuits such that the light sources are controllable in response to the analog input signal to provide color mixing.

* * * * *